United States Patent
Grill et al.

(10) Patent No.: US 10,999,156 B2
(45) Date of Patent: May 4, 2021

(54) MOBILITY SERVICES PLATFORM FOR SELF-HEALING MOBILITY CLIENTS

(71) Applicant: Aptiv Technologies Limited, St. Michael (BB)

(72) Inventors: Daniel Grill, Santa Clara, CA (US); Tao Lin, Palo Alto, CA (US); Mahbubul Alam, Mountain View, CA (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/568,970

(22) Filed: Sep. 12, 2019

(65) Prior Publication Data

US 2020/0106678 A1 Apr. 2, 2020

Related U.S. Application Data

(60) Provisional application No. 62/737,811, filed on Sep. 27, 2018.

(51) Int. Cl.
*H04L 12/24* (2006.01)
*H04L 12/26* (2006.01)
(Continued)

(52) U.S. Cl.
CPC ............ *H04L 41/16* (2013.01); *G06N 20/00* (2019.01); *H04L 41/0813* (2013.01);
(Continued)

(58) Field of Classification Search
CPC ..... H04L 41/16; H04L 41/0813; H04L 43/08; H04L 41/142; H04L 41/0672;
(Continued)

(56) References Cited

U.S. PATENT DOCUMENTS 6,757,837 B1 * 6/2004 Platt .................... G06F 11/0748
714/38.13
7,293,201 B2 * 11/2007 Ansari ................ G06F 11/0715
714/25

(Continued)

OTHER PUBLICATIONS

Schneider et al. "A survey of self-healing systems frameworks", Software—Practice and Experience Softw. Pract. Exper. 2015; 45:1375-1398 Published online Jan. 20, 2014 in Wiley Online Library (Year: 2014).*

*Primary Examiner* — David R Lazaro

(74) *Attorney, Agent, or Firm* — Colby Nipper PLLC

(57) ABSTRACT

The disclosed embodiments are directed to a mobility services platform for self-healing mobility clients. In an embodiment, a method comprises: obtaining, by one or more server computers, diagnostic data from a plurality of mobility clients; applying, by the one or more server computers, machine learning to the diagnostic data; identifying, by the one or more server computers, outlier data resulting from the machine learning; identifying, by the one or more server computers and from the outlier data, a new error class; determining, by the one or more server computers, an impact of the error class (e.g., short-term, medium-term, long-term impact) on the plurality of mobility clients; and generating, by the one or more server computers and based on the determined impact, an update for the plurality of mobility clients.

16 Claims, 4 Drawing Sheets

(51) Int. Cl.
  *G06N 20/00* (2019.01)
  *H04W 4/40* (2018.01)
  *H04W 4/44* (2018.01)

(52) U.S. Cl.
  CPC ............... *H04L 43/08* (2013.01); *H04W 4/40* (2018.02); *H04W 4/44* (2018.02)

(58) Field of Classification Search
  CPC ...... H04L 41/082; G06N 20/00; G06N 5/025; G06N 3/08; G06N 5/003; G06N 5/04; G06N 7/005; H04W 4/02; H04W 4/021; H04W 4/027; H04W 4/40; H04W 4/70
  See application file for complete search history.

(56) References Cited

U.S. PATENT DOCUMENTS

| | | | | |
|---|---|---|---|---|
| 8,903,593 | B1* | 12/2014 | Addepalli | G06F 9/542 |
| | | | | 701/29.1 |
| 9,779,557 | B2* | 10/2017 | Hauser | G07C 5/08 |
| 10,154,501 | B2* | 12/2018 | Meredith | H04W 4/44 |
| 2016/0196131 | A1* | 7/2016 | Searle | H04L 29/06 |
| | | | | 717/173 |
| 2017/0139701 | A1 | 5/2017 | Lin et al. | |
| 2018/0005463 | A1* | 1/2018 | Siegel | G07C 5/0808 |
| 2018/0232959 | A1* | 8/2018 | Thornburg | H04L 12/4625 |
| 2018/0315260 | A1* | 11/2018 | Anthony | G06N 20/00 |
| 2019/0251759 | A1* | 8/2019 | Lora | G06Q 50/30 |
| 2019/0385057 | A1* | 12/2019 | Litichever | G06N 3/08 |
| 2019/0391800 | A1* | 12/2019 | Lin | H04L 67/34 |
| 2020/0104113 | A1* | 4/2020 | Grill | G06F 8/65 |
| 2020/0106678 | A1* | 4/2020 | Grill | G06N 20/00 |

\* cited by examiner

MOBILITY SERVICES PLATFORM FOR SELF-HEALING MOBILITY CLIENTS

CROSS-REFERENCE TO RELATED APPLICATION

This application claims the benefit under 35 U.S.C. § 119(e) of U.S. Provisional Patent Application No. 62/737,811, filed Sep. 27, 2018, the entire disclosure of which is hereby incorporated herein by reference.

TECHNICAL FIELD

This disclosure relates generally to over-the-air (OTA) systems.

BACKGROUND

State-of-the-art development processes are based on the assumption that normal and erroneous OTA system behavior is well-defined prior to development of the OTA system. This assumption, however, does not hold up in practice for OTA systems for large-scale updates of mobility clients, such as vehicles and Internet of Things (IoT) devices. For example, a new error may quickly disseminate through a large population of vehicles and/or IoT devices before being discovered. After the error is discovered, there can be potentially many days or weeks of testing and debugging before a software update fixing the error is deployed to the vehicles by an OTA system. Long delays for software updates may be unacceptable to remedy systemic software errors that may put human lives at risk.

SUMMARY

The disclosed embodiments are directed to a mobility services platform for self-healing mobility clients. In an embodiment, a method comprises: obtaining, by one or more server computers, diagnostic data from a plurality of mobility clients; applying, by the one or more server computers, machine learning to the diagnostic data; identifying, by the one or more server computers, outlier data resulting from the machine learning; identifying, by the one or more server computers and from the outlier data, a new error class; determining, by the one or more server computers, an impact of the error class (e.g., short-term, medium-term, long-term impact) on the plurality of mobility clients; and generating, by the one or more server computers and based on the determined impact, an update for the plurality of mobility clients.

One or more embodiments of the disclosed system provide one or more of the following advantages. The ability of an OTA system to manage unforeseen errors in mobility clients is improved. The delay in developing and provisioning updates for unforeseen errors is significantly shortened by detecting the unforeseen errors, determining the impact on mobility clients and providing an OTA update to self-heal mobility clients. Self-healing mobility clients continue to operate (albeit with possibly lower performance or capacity) rather than being disabled or removed from service.

The details of the disclosed implementations are set forth in the accompanying drawings and the description below. Other features, objects, and advantages are apparent from the description, drawings, and claims.

Figure 1:
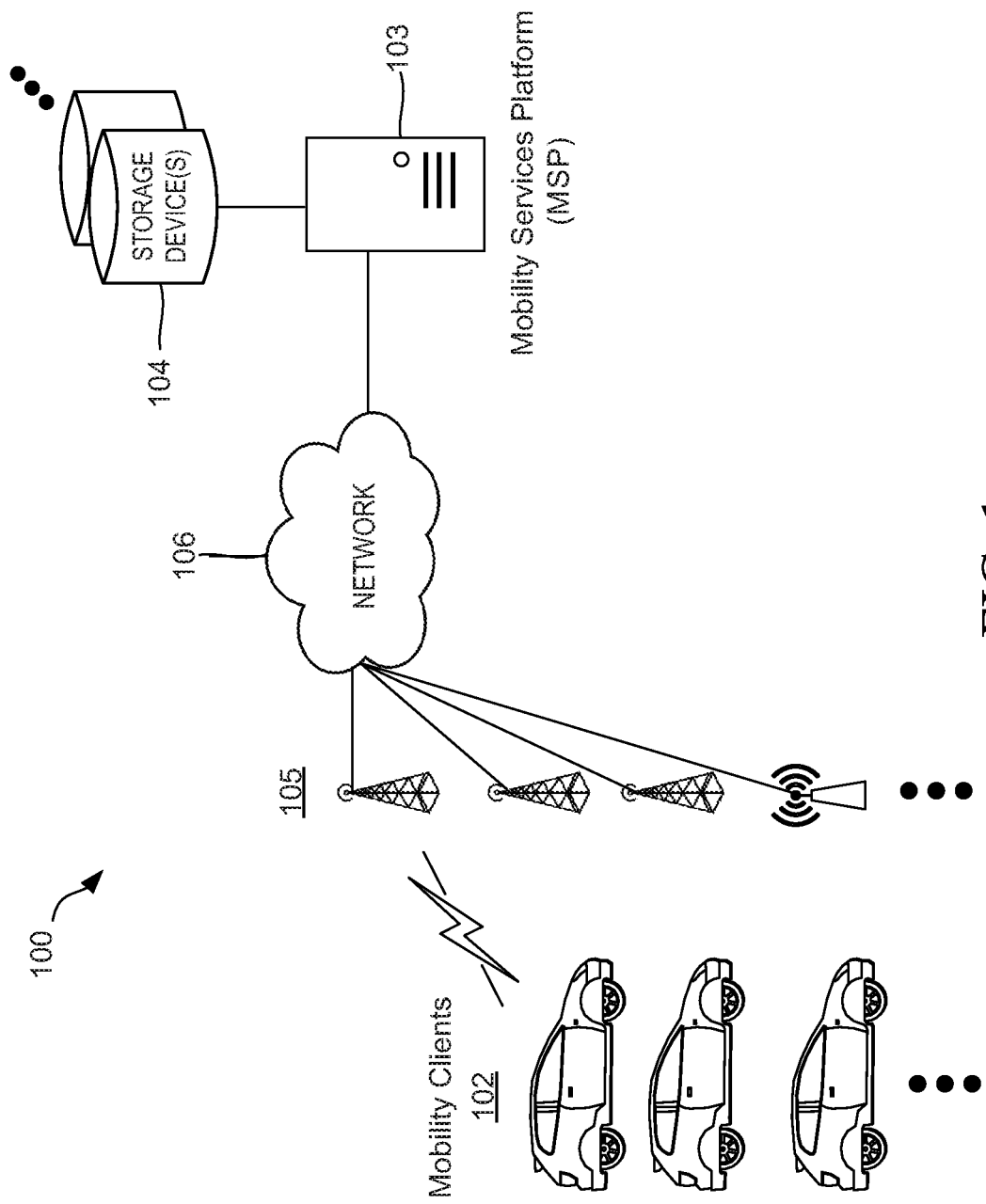
FIG. 1 illustrates and OTA environment for self-healing mobility clients, according to an embodiment.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements are not shown in the drawings so as not to obscure the disclosure. In addition, for ease of illustration, a single connecting element is used to represent multiple connections, relationships or associations between elements. For example, where a connecting element represents a communication of signals, data or instructions, it should be understood by those skilled in the art that such element represents one or multiple signal paths (e.g., a bus), as may be needed, to affect the communication.

DETAILED DESCRIPTION

Reference will now be made in detail to embodiments, examples of which are illustrated in the accompanying drawings. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In some instances, functions in claims will be preceded with the phrase "one or more." The phrase "one or more" as used herein includes a function being performed by one element, a function being performed by more than one element, e.g., in a distributed fashion, several functions being performed by one element, several functions being performed by several elements, or any combination of the above.

In some instances, claim elements will be preceded with the terms first, second, third and so forth. It should be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises." and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context."

Several features are described hereafter that can each be used independently of one another or with any combination of other features. However, any individual feature may not address any of the problems discussed above or might only address one of the problems discussed above. Some of the problems discussed above might not be fully addressed by any of the features described herein.

Operating Environment

FIG. 1 illustrates an OTA operating environment for self-healing mobility clients, according to an embodiment. Operating environment 100 includes mobility clients 102, mobility services platform (MSP) 103, storage devices 104, access points 105 (e.g., cell towers, WiFi routers) and network 106 (e.g., the Internet).

Figure 3:
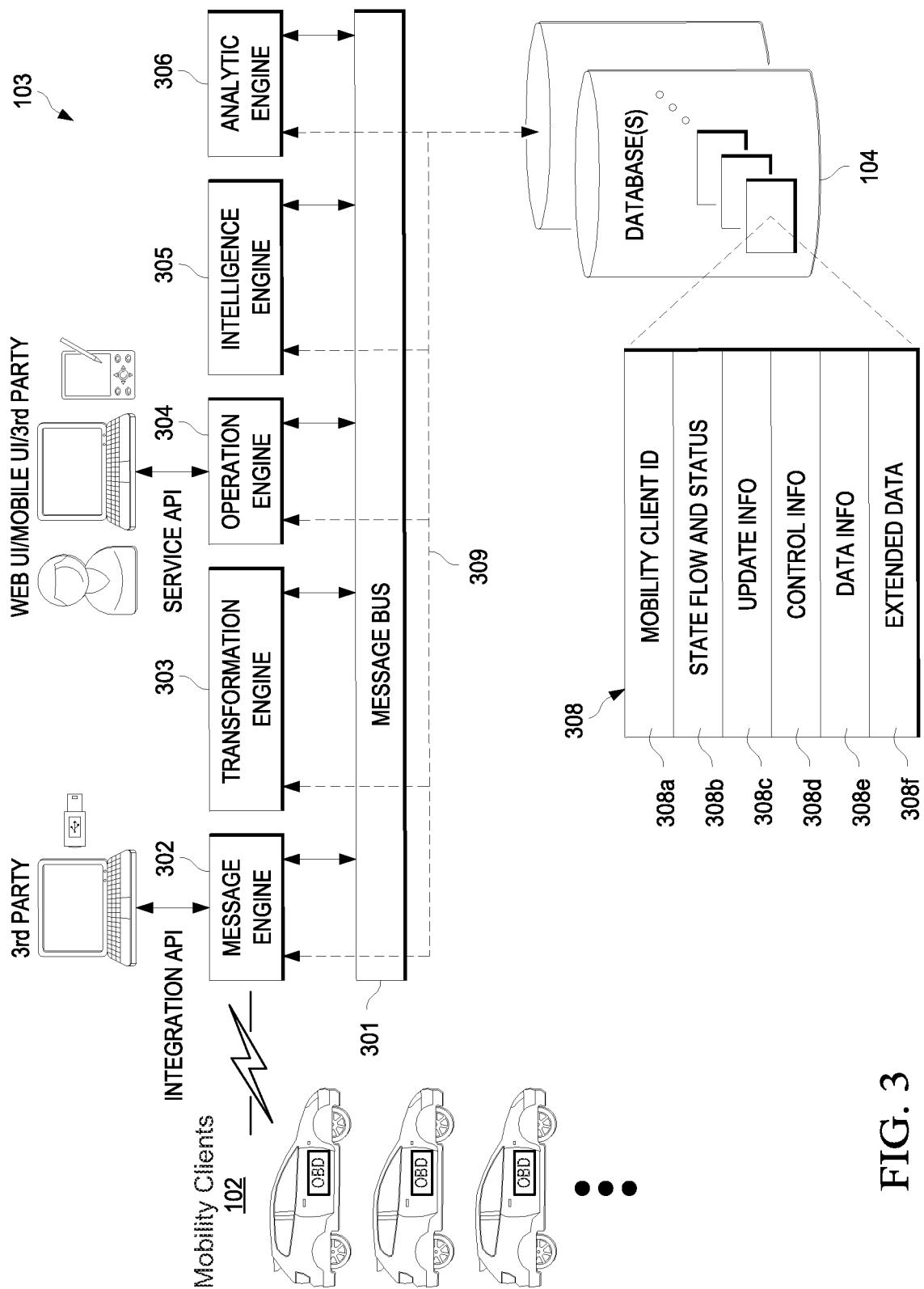
FIG. 3 is a block diagram of a mobility services platform for self-healing mobility clients, according to an embodiment.

In an embodiment, MSP 103 is a distributed computing platform that includes a data stream processing pipeline architecture for processing real-time data feeds from mobility clients 102, as described in reference to FIG. 3. MSP 103 includes a plurality of interconnected processors, routers, hubs, gateways, storage devices and other hardware that communicate data, commands and signals, over one or more buses. MSP 103 facilitates OTA update campaigns for original equipment manufacturers (OEMs) and other entities and/or mobility services, such as application developers who desire to update various devices/components installed or embedded in mobility clients 102.

Mobility clients 102 include any non-autonomous, autonomous or semi-autonomous vehicle, or any device, such as IoT devices and electronic control units (ECUs) that are capable of receiving an OTA update. As used herein, "vehicle" means any machine or apparatus that transports goods or people. For example, cars, buses, trains, airplanes, drones, trucks, boats, ships, submersibles, dirigibles, mobile robots, etc. As used herein, the term "OTA update" means any over-the-air update, change, deletion or addition to software, firmware, data or configuration settings, or any combination thereof that is delivered to mobility clients 102 using proprietary or standardized wireless communications technology, including but not limited to: cellular mobile communications (e.g., 2G, 3G, 4G, 5G), radio wireless area networks (e.g., WiFi) and satellite Internet.

Example Self-Healing OTA System

Figure 2A:
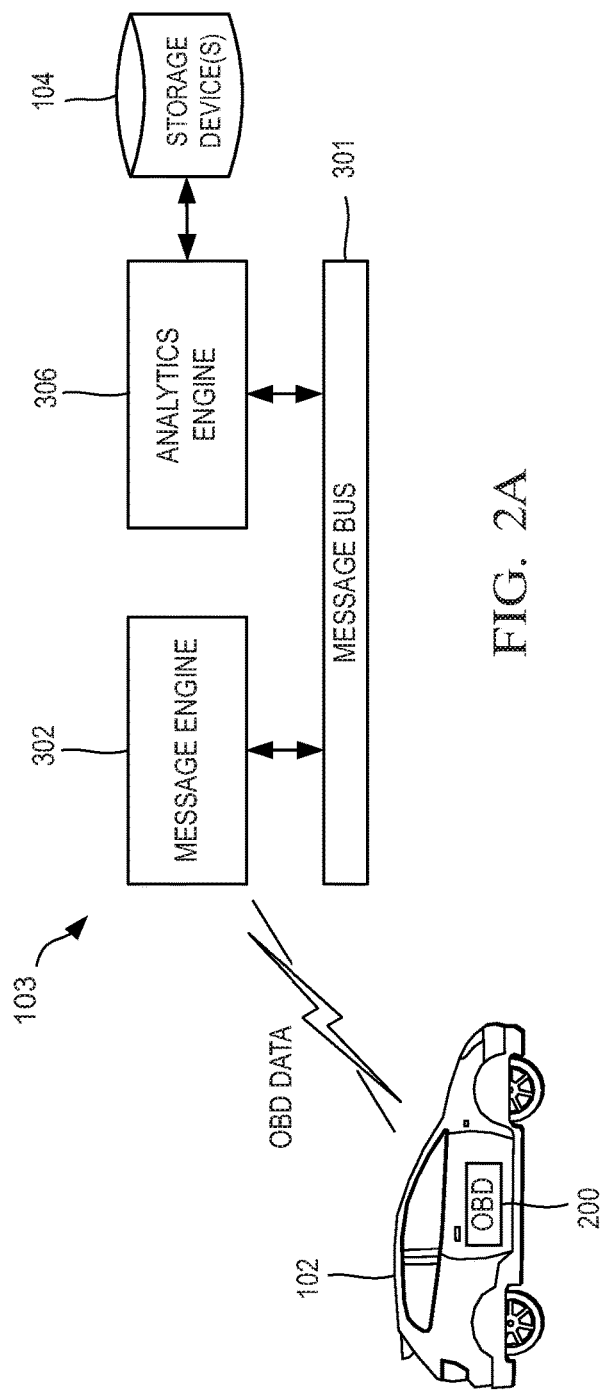
FIGS. 2A and 2B are block diagrams illustrating a self-healing system for mobility clients, according to an embodiment
Figure 2B:
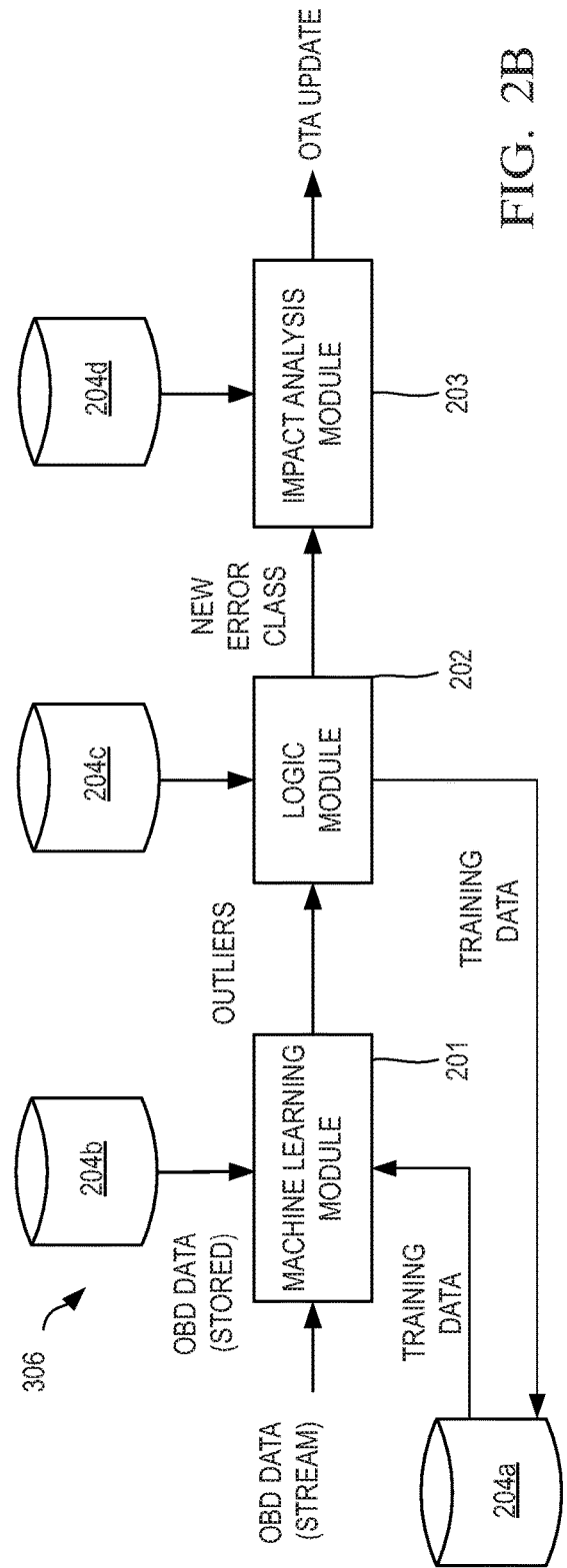

FIGS. 2A and 2B are block diagrams of a self-healing OTA system for mobility clients 102, according to an embodiment. Mobility clients 102 have installed one or more onboard diagnostic (OBD) devices 200 that collect and wirelessly transmit OBD data in real-time or non-real-time to MSP 103. Message engine 302 receives the OBD data from mobility client 102 and places the data on message bus 301 so that is available to various processes and engines of MSP 103. For example, OBD data can be processed by analytics engine 306 and stored in one or more storage devices 104, as described in reference to FIGS. 2B and 3.

If mobility clients 102 are vehicles (which is assumed in the examples that follow), OBD data is collected from various subsystems, components and sensors of the vehicles, including but not limited to: power train (engine, gearbox), braking system (e.g., brake pressure, brake pad thickness), steering system, ignition system (e.g., number of ignition cycles), transmission system, suspension system, emission control system (e.g., emission readiness status), fuel and air metering systems (e.g., oxygen sensor test results), infotainment system, tire pressure, external communication system (e.g., wireless, GNSS), electrical/electronic architecture (e.g., ECUs performing various functions), computer system, automated driving server (e.g., for AVs), gateways, environment sensors (e.g., a temperature, $CO_2$ emissions detector), perception sensors (e.g., LiDAR, radar, sonar, stereo cameras), consumables status (e.g., fuel remaining, electric charge remaining, brake fluid level, transmission fluid level, water/coolant level, windshield cleaning fluid level), real-time parameters (e.g., vehicle speed, RPM, pedal position, spark advance, airflow rate, coolant temperature), fuel/charge efficiency, idle time, user driving pattern data (e.g., acceleration or braking patterns), geographic location (e.g., from a GNSS receiver, cellular or WiFi network, dedicated short-range communications (DSRC) with other vehicles), vehicle identification data (e.g., VIN), malfunction reports and any other information generated by any vehicle subsystem or component.

In an embodiment, ECUs may store data, such as time-series sensor data and internal state data recordings prior, during and after detected error events. There may also be aggregated data such as multidimensional histograms of sensor and state data. Stored data may be able to read out via an OBD device interface (e.g., powertrain freeze-frame data).

In an embodiment, OBD device 200 uses a standardized communications port to provide real-time data in addition to a standardized series of diagnostic trouble codes (DTCs) that allow rapid identification and remedy of malfunctions within the vehicle. The digital communications port can be coupled to a wireless transceiver in the vehicle through a vehicle bus (e.g., CAN bus, FN-CAN bus, Ethernet). The wireless transceiver transmits the OBD data to MSP 103 using any suitable protocol and wireless communications technology (e.g., cellular, WiFi).

Referring to FIG. 2B, in an embodiment analytics engine 306 includes machine learning module 201, logic module 202 and impact analysis module 203. Each of these modules are coupled to their respective database 204b-204d. Machine learning module 201 can implement any desired machine learning algorithm, process or network that is capable of classifying or labeling errors and identifying outlier feature sets in OBD data collected from mobility clients 102.

In an embodiment, machine learning module 201 uses either supervised or unsupervised feature learning. In supervised feature learning, features are learned using labeled training data stored in database 204a. Some examples of supervised learning include but are not limited to: supervised neural networks, multilayer perceptron and (supervised) dictionary learning. In unsupervised feature learning, features are learned with unlabeled input data. Some examples of unsupervised learning include but are not limited to: dictionary learning, principal or independent component analysis, auto encoders, matrix factorization and clustering algorithms (e.g., k-means, CURE, BIRCH). In an embodiment, a self-learning system can be implemented by machine learning module 201 to automatically detect outliers, such as Tensorflow™ released under the publicly available Apache 2.0 open source license. In an embodiment, vehicle data can be stored in a database and reviewed by data analysts using a variety of data analytic tools, such as clustering and decision trees.

In an embodiment, training data stored in database 204a can be used to train one or more supervised neural networks based on known vehicle errors provided by, for example, an OEM of the vehicle. In operation, OBD data provided in real-time from mobility clients 102 (or from database 204b in non-real-time) are arranged into feature sets (e.g., feature vectors) or other suitable format and input into one or more supervised neural networks to be labeled or classified. Any feature set that cannot be labeled or classified by the one or more neural networks (e.g., because it was not part of the training data) is considered an outlier feature set. As used herein, an "outlier feature set" is an observation of a set of features that deviates so much from other observations of the set of features as to arouse suspicion that it was generated by a different mechanism.

Outlier feature sets identified by machine learning module 201 are input into logic module 202, which determines if the outlier feature sets indicate a new error class for a particular vehicle make, model and build. In an embodiment, logic module 202 includes a rules based engine and/or an inference engine that takes as input the outlier feature sets, vehicle information and logic rules from database 204c and determines if a new error class for the vehicle make, model and build has been detected. The rules or inference engine applies the logic rules (e.g., if-then rules) to the outlier feature set and vehicle information and deduces whether a new error class is detected. In this example, vehicle information includes but is not limited to performance specifications, component data sheets and simulation or digital twin model output for the vehicle make, model and build. A "digital twin" refers to a digital representation of a physical system (e.g., a vehicle) that integrates one or more of artificial intelligence (AI), machine learning and software analytics with data to create a digital simulation model of the physical system that updates and changes as the physical system updates and changes.

In an embodiment, logic module 202 integrates simulation and validation models that are created during specification, development and testing of vehicle systems and sub-systems. Logic module 202 can be implemented as a software module (e.g., a simulator) or as a hardware and software system module using real vehicle components (e.g., test bench set-up) in combination with test automation tools that simulate sensor outputs and environmental conditions.

An example approach of detecting outlier feature sets using replicator neural networks is described in, Hawkins S., He H., Williams G., Baxter R. (2002) *Outlier Detection Using Replicator Neural Networks*. In: Kambayashi Y., Winiwarter W., Arikawa M. (eds) Data Warehousing and Knowledge Discovery. DaWaK 2002. Lecture Notes in Computer Science, vol. 2454. Springer, Berlin, Heidelberg. An example of an unsupervised learning approach to detect an outlier feature set is a clustering algorithm (e.g., k-means, DBSCAN, CURE, BIRCH) that designates a feature set that occurs in a very small cluster, or is distant from one or more other clusters as an outlier feature set. Other techniques for error classification include logistic regression, naïve Bayes, stochastic gradient descent, k-nearest neighbor, decision trees and random forest. Other techniques for outlier detection include z-score or extreme value analysis, probabilistic and statistical modeling, linear regression models, proximity-based models, information theory models and high dimensional outlier detection methods.

For example, logic module 202 may determine from the performance specifications that the operating range (miles per charge) for a particular make, model and build of electric car is a standard deviation lower than the minimum operating range described in the performance specification when the temperature of the vehicle's operating environment is below or above a certain temperature (e.g., a winter climate or desert climate). Logic module 202 determines that the operating range is affected by the temperature and designates or labels a new error class for the vehicle make, model and build based on the average temperature in the operating environment. For example, a vehicle's battery power used to heat or cool the battery takes power away from the vehicle's operating range. An example, new error class could be labeled by make, model, battery serial number or model and the average outside temperature. The average outside temperature can be obtained from multiple temperature readings using external vehicle temperature sensors.

Another example self-healing scenario is the over-heating of electronic components in a vehicle. For example, an ECU in a vehicle may overheat during certain environmental or use conditions. Self-healing may disable temporarily non-critical vehicle functions to reduce the ECU's CPU load and therefore reduce the heat generation to remedy the issue. In another example, an infotainment system in a vehicle crossing a desert area during an unusual hot summer day may overheat. Instead of shutting down the entire infotainment system, self-healing may keep the navigation functionality enabled but temporarily disable the CPU-intensive entertainment functions, such as internet radio streaming. In an embodiment, a software update may optimize code to reduce CPU load (e.g., by reducing frequency of recurring calculations).

In another example self-healing scenario, remedies are provided for defective sensors or wiring in a vehicle. For example, a defective sensor may not be crucial for all vehicle operations. If a sensor for an autonomous vehicle fails (e.g., a radar), self-healing may still allow automated driving at a low speed using other sensors (e.g., LiDAR and/or camera information). A software update may not remedy this issue, but self-healing would keep the vehicle operational on a limited level. In another example, an ultra-sonic parking sensor on the left side of a vehicle becomes inoperable. The issue is caused by a mechanical issue where dirt penetrated the sensor membrane. A self-healing of a parking assistance function that uses the defective sensor may still allow parallel parking on the right side of the vehicle using other sensors instead of disabling the entire parking function for the vehicle. In an embodiment, a software/configuration update may recalibrate the sensor to deal with the changed characteristics of the sensor and remedy the situation.

After a new error class is determined, appropriate training data is generated automatically by logic module 202 (or manually by data analysts) and stored in database 204a to be used to train algorithms (e.g., one or more neural networks) implemented by machine learning module 201. This supervised learning mechanism allows the new error class to be detected by the algorithms in subsequent OBD data provided by vehicles.

Impact analysis module 203 determines the short, medium and long-term impact of the new error class on the vehicle, its passengers and the environment, including but not limited to: vehicle performance, vehicle drivability, passenger safety, passenger comfort, vehicle maintenance, safety to objects in the environment (e.g., other vehicles, pedestrians) and the impact of emissions on the operating environment. Impact analysis module 203 uses one or more algorithms and/or human input to analyze the impact the new error class has on affected mobility clients 102. Based on the results of the impact analysis, an OTA update is generated to be deployed to the vehicles affected by the error class using MSP 103. In an embodiment, a rules and/or inference engine can be used to determine impact based on vehicle information, simulations, statistical data, environmental impact studies or any other information. In the present example, impact analysis module 203 determined that there is an impact on vehicle performance and prepared a remedy to reduce or avoid the impact to vehicle performance.

In an embodiment, impact analysis can be implemented by a logic tree that "classifies" the impact level and automatically suggests an appropriate correction workflow. For example, the classes could include limited function without customer perceivable impact, limited function with regulations impact, limited function with customer perceivable impact and loss of function and loss of function with passenger safety impact.

In an embodiment, the remedy is included in one or more OTA updates to vehicle software, firmware, configuration settings, data fields or algorithm parameters. The remedy can also be a message included in the OTA update or sent through another communication medium (e.g., email, text message to passenger's mobile device) to the affected vehicles, or alerts performed by the vehicle (e.g., warning lights/indicators, text messages, audio) presented through vehicle output devices (e.g., display screens, indicator lights, audio system, heads-up display, dashboard instrument cluster).

Using the above example, the remedy could be to use an OTA update to reconfigure battery monitoring systems in the affected vehicles to monitor recharge times differently in colder or hotter weather, to preheat or cool the affected vehicles while the vehicles are plugged into charging stations to reduce battery drain, and/or sending a messages/alerts/notifications to the affected vehicles instructing passengers to use electric seat heaters to keep warm.

In some embodiments, one or more vehicle systems or components are updated to handle the new error class by algorithms already pre-existing in the vehicle software/firmware (reconfiguration of error handling routines) or by adding new appropriate algorithms by reprogramming the systems or components (e.g., reprogramming ECU memory) through an OTA update from MSP 103, using USB thumb drive or other portable storage device or an update from a home network (e.g., driver's WiFi network).

Mobility Services Platform (MSP)

FIG. 3 is a block diagram of a mobility services platform for self-healing mobility clients 102, according to an embodiment. In an embodiment, MSP 103 is a distributed computing platform that includes a data stream processing pipeline architecture for processing real-time data feeds using a scalable publication/subscription message queue as a distributed transaction log. In some exemplary embodiments, MSP 103 includes message bus 301, message engine 302 and database(s) 104. In some exemplary embodiments, MSP 103 optionally includes transformation engine 303. In some exemplary embodiments, MSP 103 optionally includes operation engine 304. In some exemplary embodiments, MSP 103 optionally includes intelligence engine 305. In some exemplary embodiments, MSP 103 optionally includes analytic engine 306. In an embodiment, one or more of engines 302-306 are each an instance of a software method that runs on one or more servers of MSP 103. These software instances are configured to communicate with each other using message bus 301. Multiple instances of engines 302-306 can run concurrently. Engines 302-306 provide OTA services (e.g., software updates, client connectivity, remote control and operation monitoring), and data services (e.g., data ingestion, data storage/management, data analytics, real-time processing and data retrieving control).

In an embodiment, a load balancer (not shown) running on one or more servers manages connection requests from mobility clients 102 by listening on one or more ports connected to mobility clients 102 to access OTA services. The load balancer forwards requests to a backend server that has at least one instance of message engine 302 running. In an embodiment, the load balancer maintains persistence (server affinity) to ensure that connections and subsequent requests from mobility clients 102 are sent to the same server after a service interruption (e.g., due to a lost connection). Messages sent by mobility clients 102 can be formatted in any known data-interchange format, such as Extensible Markup Language (XML) or Java® Script Object Notation (JSON).

In an embodiment, message bus 301 is implemented by a distributed streaming platform. The distributed streaming platform publishes and subscribes to streams of messages (also referred to as "records"), stores the streams of messages in database(s) 307 and provides a real-time streaming data pipeline that can transfer the streams of messages between engines 302-306. An example message bus 301 is the Apache Kafka® distributed streaming platform. In an embodiment, consumers of messages can subscribe to a particular "topic" to retrieve messages from message bus 301 for that topic. A topic is a category or feed name to which messages are published. The topics are multi-subscriber and can have zero, one, or many consumers that subscribe to the data written to the topic. Raw input data is consumed from topics and then aggregated, enriched, or otherwise transformed into new topics for further consumption or follow-up processing by other consumers of MSP 103.

In an embodiment, data structure 308 is created for mobility client devices 102 and stored in one or more databases 307. Each instance of each engine 302-306 can create a copy of data structure 308 for a particular mobility client 102, and read or write data to any field 308b-308f in data structure 308. A copy of data structure 308 for every mobility client 102 can be stored on a plurality of distributed databases. A background process implemented by MSP 103 can maintain coherency between different copies of data structure 308 stored on distributed databases.

In an embodiment, data structure 308 includes a number of fields for exchanging data between mobility clients 102 and MSP 103. In the example shown, the fields include but are not limited to: Mobility Client ID field 308a, State Flow/Status field 308b, Update Info field 308c, Control Info field 308d, Data Info field 308e and Extended Data field(s) 308f. These fields are exemplary and other embodiments of data structure 308 can have more or fewer fields.

Mobility Client ID 308a can be a Universally Unique Identifier (UUID) that uniquely identifies a mobility client 102. In an embodiment, Mobility Client ID 308a stores a Vehicle Identification Number (VIN) that can be used to uniquely identify a mobility client 102. State Flow/Status field 308b includes state and session-specific information for persistence (server affinity). Update Info field 308c includes information associated with a particular software update, such as a download information file provided by intelligence engine 305. Control Info field 308d includes commands for remote control of an OTA client, such as a disable command to disable a particular software version installed on the mobility client 102. For inbound messages, Data Info field 308e includes the name of the mobility client 102, a timestamp and a link to a software package for the mobility client 102 that is stored in a software package repository. For outbound messages, the Data Info field 308e is used to send data and commands to the mobility client 102.

Extended Data field(s) 308f are used to send and receive data or services. Extending Data fields 308f can include links to data or service providers (e.g., URIs, URLs, pointer) or an application programming interface (API). For example, if a mobility client 102 requests a service or data that is hosted by a third party data or service provider external to MSP 103, then Extended Data field(s) 308f can provide an interface to the data or service and MSP 103 will handle the necessary connections to the third party server computers to request and receive results generated by the third party server computers. In this manner, each mobility client 102 will have data structure 308 with a number of customized Extended data filed(s) 308f based on the particular services or applications subscribed to by the mobility client 102. For example, if the mobility client 102 wants to subscribe to a traffic or weather service, access to the traffic or weather service is provided through the Extended Data field(s) 308f of data structure 308 for that mobility client 102. The services can be hosted on third party server computers (e.g., hosted by server farm) or by MSP server computers. The services that can be subscribed to include any service that is available through any mobile application accessible by, for example, a smartphone. This feature is advantageous because it allows integration of mobile applications that the user is already subscribed to on their smartphone or tablet computer to be available in their vehicle through, for example, an entertainment system or vehicle computer.

In an embodiment, third party software can be hosted on servers of MSP 103 and Extended Data field(s) 308f provide access to the services through an API or other interface mechanism. In an embodiment, user profile data can be sent to MSP 103 in Extended Data field(s) 308f. Personal profile information can be any data related to the personal preferences of an operator of the mobility client 102, including but not limited to: climate control data, seat and mirror adjustment data, entertainment preference data (e.g., radio presets, music playlists), telephone contact lists, navigation data (e.g., history data, destination locations) and any other data that is personalized to a particular operator of the mobility client 102.

In an embodiment, Extended Data field(s) 308f can include multiple personal profiles. For example, each member of a family who shares the mobility client 102 can have their own personal profile. Also, if the mobility client 102 is part of a fleet of mobility clients 102 (e.g., taxis, rental cars, company vehicles), then personal profiles for each operator can be stored in database(s) 104.

In another embodiment, extended data fields(s) 308f can be used for a Mobile Device Management (MDM) service. For example, MDM data downloaded onto the mobility client 102 can allow or restrict employees from using certain features, including imposing and enforcing policies on the mobility client 102, such as policies to optimize mobility client 102 usage and secure data. For example, MDM data can configure a mobility client 102 to report mobility client data to MSP 103 where it can be further analyzed. Mobility client data can include but is not limited to: location data (e.g., timestamp, latitude, longitude, and altitude), sensor data (e.g., acceleration data, gyroscope data) and environment data (e.g., temperature data). In an embodiment, the location data can be used to determine if a mobility client 102 has entered or exited a geofence (a virtual geographic boundary) to trigger a download of a software package or perform some other location-based service.

In an embodiment, geofence crossings can be used to determine if a corporate policy has been violated. For example, drivers for a taxi service may be prohibited from traveling within or outside a certain geographic region enclosed by a geofence. If the mobility client 102 is a self-driving vehicle, then Extended Data fields(s) 308f can include mobility client 102 data specific to self-driving vehicles, such as LiDAR, ultrasonic sensors, radar, Global Navigation Satellite System (GNSS), stereo camera and map data. In an embodiment, the mobile client data can be used by analytic engine 306 to detect and predict various maintenance problems with mobility clients 102.

After the load balancer (not shown) receives a message from a mobility client 102, the load balancer sends the message to a MSP server that is running an instance of message engine 302. Message engine 302 provides an end-point to communicate with one or more mobility clients 102 and supports both inbound and outbound message processing. The number of message engines 301 that are concurrently running is based on the number of active connections with mobility clients 102. In an embodiment, the load balancer and/or message engine 302 implements one or more protocols for communicating with mobility clients 102, including but not limited to: Transmission Control Protocol/Internet Protocol (TCP/IP), Hypertext Transfer Protocol (HTTP), Hypertext Transfer Protocol Secure (HTTPS), Message Queue Telemetry Transport (MQTT) protocol and Open Mobile Alliance Device Management (OMA-DM) protocol.

In an embodiment, message engine 302 reads the message header and performs version authentication. An integration Application Programming Interface (API) allows third party applications to communicate with message engine 302 over a network (e.g., the Internet). For example, the SOTA service may be unavailable, or the software update may be too large to transfer using the SOTA service. In such cases, the integration API may be used by an application running on a personal computer or mobile device to upload or deliver a software package to a personal computer over a network. After the package is downloaded to the personal computer it can be transferred to a Universal Serial Bus (USB) thumb drive. For example, a technician in a repair shop or dealership can download a software package from MSP 103 to a personal computer, transfer the package to a thumb drive, and then connect the thumb drive directly to a port of a vehicle computer to transfer the software package to the vehicle.

Transformation engine 302 reads the message body and transforms the message body into a common message data format used by message bus 301 (e.g., the Kafka® streaming format).

Operation engine 304 supports data operations, software operations and system issue management. Operation engine 304 provides a Web portal and mobile user interface (UIs) to communicate with system clients (e.g., OEMs, software developers). Operation engine 304 generates reports with visualizations (e.g., charts, tables), which can be viewed on the Web portal and/or mobile UIs, and sends notifications/alerts to system clients using various modes of communication (e.g., email, push notification, text message). Operation engine 304 also provides a service API that allows system clients to access mobility services using their proprietary applications. In an embodiment, the service API supports a payment system that manages billing-based software updates using data retrieved through the service API.

Intelligence engine 305 supports various OTA operations, including software packaging, software dependency checking, scheduling and monitoring.

Analytic engine 306 supports business intelligence, including report generation and alert detection. Analytic engine 306 also provides an Interactive Development Environment (IDE) that includes a dashboard and workflow canvass that allows a data analyst to build, test and deploy distributed workflows using real-time message streams or a database as a data source. In an embodiment, analytic engine 306 implements the self-healing system described in reference to FIGS. 2A and 2B.

In an embodiment, database(s) 107 include(s) a relational database (e.g., SQL database) and a distributed NoSQL database (e.g., Apache Cassandra™ DBMS with Elasticsearch™ service) for storing messages, data logs, software packages, operation history and other data. The data stored can be either structured or unstructured. In an embodiment, engines 302-306 can communicate with database(s) 107 over data access layer (DAL) 309 using, for example, the Java® EE data access object (DAO).

Example Self-Healing Process

Figure 4:
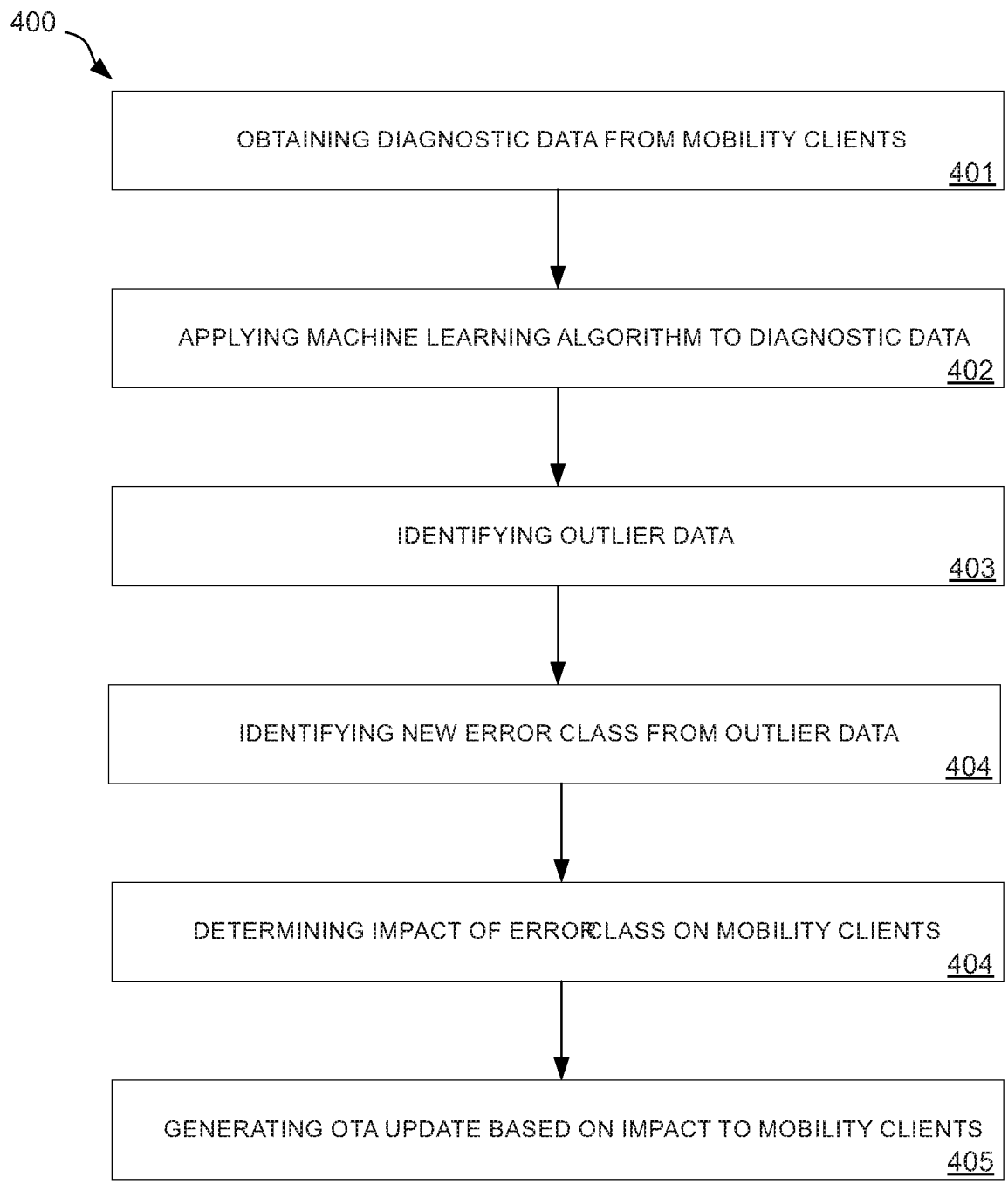
FIG. 4 is a flow diagram of a process for self-healing mobility clients, according to an embodiment.

FIG. 4 is a flow diagram of a self-healing process for mobility clients 102, according to an embodiment. Process 400 can be implemented by MSP 103 as described in reference to FIG. 3.

Process 400 begins by obtaining diagnostic data from mobility clients (401). For example, an OBD device 200 in the mobility client 102 can collect and store OBD data that is transmitted in real-time or non-real-time to an MSP 103.

Process 400 continues by applying machine learning algorithm(s) to the diagnostic data (402) and identifying outlier data (403). For example, the OBD data can be formatted into a feature set or other suitable input to one or more machine learning algorithms are processes (e.g., supervised neural networks). The machine learning algorithms or processes are configured to identify outlier data using supervised (e.g., neural networks) or unsupervised learning (e.g., clustering).

Process 400 continues by identifying a new error class from the outlier data and other information (404). For example, a rules and/or inference engine (e.g., if-then rules) can be used to determine if the outlier data represents a new error class and to label the class. Vehicle information, such as performance specifications, can be used to identify and label the new error class. In a supervised learning embodiment, the labeled new error class is added to the training data so that subsequent processing of OBD data will recognize the new error class.

Process 400 continues by determining an impact of the error class on mobility clients (405). For example, an impact analysis can be performed on the new error class to determine the short, medium and long-term impact of the new error class on mobility clients 102. In an embodiment, a rules and/or inference engine can be used with vehicle information, data sheets, simulation data, digit twin output and any other available data, to determine the impact of the new error claims on mobility clients 102, and to determine a remedy to reduce or eliminate the impact.

Process 400 continues by generating an OTA update that includes the remedy to reduce or eliminate the impact to mobility clients (405). Remedies include but are not limited to software and/or firmware updates, reprogramming, updating configuration settings or data or sending messages or alerts to the affected mobility clients 102.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C #, Java), including compiled or interpreted languages, and it can be deployed in any form, including as a stand-alone program or as a module, component, subroutine, a browser-based web application, or other units suitable for use in a computing environment.

While this document contains many specific implementation details, the implementation details should not be construed as limitations on the scope of what may be claimed but rather as a description of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

While logic flows or operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various software components in the embodiments described above should not be understood as requiring such separation in all embodiments, and it should be understood that the described software components can generally be integrated together in a single software program or multiple software programs.

Some aspects of the subject matter of this specification may include gathering and use of data available from various sources. The present disclosure contemplates that in some instances, this gathered data may identify a particular location or an address based on device usage. Such personal information data can include location-based data, addresses, subscriber account identifiers, or other identifying information. The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure.

What is claimed is:

1. A method comprising:
    obtaining, by one or more server computers, diagnostic data from a plurality of mobility clients;
    applying, by the one or more server computers, machine learning to the diagnostic data, the machine learning comprising:
        formatting at least some of the diagnostic data into a first feature set; and
        identifying an outlier feature set, the outlier feature set determined by:
            applying supervised learning to the first feature set; or
            applying unsupervised learning to the first feature set;
    determining, by applying a set of rules to the outlier feature set, a new error class;
    determining an impact of an error represented by the new error class occurring on the plurality of mobility clients;
    determining a remedy to reduce or eliminate the impact; and
    generating, by the one or more server computers, an update for the plurality of mobility clients, the update based on the determined remedy.

2. The method of claim 1, wherein the supervised learning includes processing the feature set using one or more neural networks.

3. The method of claim 1, wherein the unsupervised learning includes clustering the feature set.

4. The method of claim 1, wherein the mobility clients are vehicles.

5. The method of claim 1, wherein the mobility clients are devices.

6. The method of claim 1, further comprising:
    sending, by the one or more server computers to one or more affected mobility clients, an OTA update for implementing the determined remedy.

7. The method of claim 6, wherein the determined remedy includes reprogramming memory of the affected mobility clients to add a new algorithm or reconfigure a pre-existing algorithm on the one or more affected mobility clients.

8. The method of claim 6, wherein the determined remedy includes reconfiguring error handling routines of an existing algorithm on the one or more affected mobility clients.

9. A system comprising:
    one or more server computers configured to obtain diagnostic data from a plurality of mobility clients, the one or more server computers further configured to:
    apply machine learning to the diagnostic data, the machine learning comprising:
        formatting at least some of the diagnostic data into a feature set; and
        identifying an outlier feature set, the outlier feature set determined by:
            applying supervised learning to the first feature set; or
            applying unsupervised learning to the first feature set;
    determine, by applying a set of rules to the outlier feature set, a new error class;
    determine an impact of an error represented by the new error class occurring on the plurality of mobility client;
    determine a remedy to reduce or eliminate the impact; and
    generate an update for the plurality of mobility clients based on the determined remedy.

10. The system of claim 9, wherein the supervised learning includes processing the feature set using one or more neural networks.

11. The system of claim 9, wherein the unsupervised learning includes clustering the feature set.

12. The system of claim 9, wherein the mobility clients are vehicles.

13. The system of claim 9, wherein the mobility clients are devices.

14. The system of claim 9, wherein the one or more server computers are further configured to send an OTA update for implementing the determined remedy to one or more affected mobility clients.

15. The system of claim 14, wherein the determined remedy includes reprogramming memory of the affected mobility clients to add a new algorithm or reconfigure a pre-existing algorithm on the one or more affected mobility clients.

16. The system of claim 14, wherein the determined remedy includes reconfiguring error handling routines of an existing algorithm on the one or more affected mobility clients.

* * * * *